United States Patent
Lapierre

[11] Patent Number: 6,075,550
[45] Date of Patent: Jun. 13, 2000

[54] CENSORING ASSEMBLY ADAPTED FOR USE WITH CLOSED CAPTION TELEVISION

[76] Inventor: Diane Lapierre, 88 Templeson Rd SE, Calgary, Canada, T1Y 5M1

[21] Appl. No.: 08/997,531

[22] Filed: Dec. 23, 1997

[51] Int. Cl.[7] ............................ H04N 7/16; H04N 7/087; H04N 7/025; H04N 7/035

[52] U.S. Cl. ........................ 348/5.5; 348/465; 348/468; 348/478

[58] Field of Search ............................. 348/5.5, 9, 473, 348/474, 476–479, 553, 563, 564, 725, 907, 461, 465, 468; 380/7, 10; 386/1, 4, 46, 52, 95; H04N 7/08, 7/087, 7/025, 7/035

[56] References Cited

U.S. PATENT DOCUMENTS

| | | | |
|---|---|---|---|
| 4,229,765 | 10/1980 | Sanger | 358/188 |
| 4,554,584 | 11/1985 | Elam et al. | 358/165 |
| 4,605,964 | 8/1986 | Chard | 358/147 |
| 4,888,796 | 12/1989 | Olivo, Jr. | 379/101 |
| 4,930,160 | 5/1990 | Vogel | 380/23 |
| 5,172,111 | 12/1992 | Oliva | 340/825.31 |
| 5,195,135 | 3/1993 | Palmer | 380/20 |
| 5,199,077 | 3/1993 | Wilcox et al. | 381/43 |
| 5,371,795 | 12/1994 | Vogel | 380/23 |
| 5,387,942 | 2/1995 | Lemelson | 348/474 |
| 5,477,277 | 12/1995 | Shimoyanagida | 348/632 |
| 5,543,851 | 8/1996 | Chang | 348/468 |
| 5,561,457 | 10/1996 | Cragun et al. | 348/461 X |
| 5,572,260 | 11/1996 | Onishi et al. | 348/460 |
| 5,583,576 | 12/1996 | Perlman et al. | 348/460 |
| 5,659,366 | 8/1997 | Kerman | 348/460 |
| 5,703,655 | 12/1997 | Corey et al. | 348/475 X |
| 5,751,335 | 5/1998 | Shintani | 348/5.5 |
| 5,828,402 | 10/1998 | Collings | 348/5.5 |

*Primary Examiner*—Andrew I. Faile
*Assistant Examiner*—John W. Miller
*Attorney, Agent, or Firm*—David S. Thompson

[57] ABSTRACT

A censoring assembly is adapted for use with a television tuner outputting a signal having a closed caption component signal. A closed caption decoding device produces a video signal having no closed caption component and converts the closed caption component into an uncensored text data signal. A censor device deletes words contained within the uncensored text data signal found in a list of offensive words, creating a censored text data signal, and may also turn off the audio signal for a timed period. The list of offensive words is generally pre-loaded with such words and phrases, but the censor device typically contains support for allowing the user to add objectionable words and for the down-loading of objectionable words from a remote location. A closed caption generator inputs the video signal having no closed caption component and the censored text data signal and generates a video signal having a censored closed caption component.

6 Claims, 4 Drawing Sheets

CENSORING ASSEMBLY ADAPTED FOR USE WITH CLOSED CAPTION TELEVISION

CROSS-REFERENCES

There are no applications related to this application filed in this or any foreign country.

BACKGROUND

It is a common desire of many television viewers to censor certain words and phrases from the audio and/or closed caption video portion of broadcast, cable and video cassette programming. Often the desire of the viewer is to regulate the programming content seen by children; however, other viewers simply desire to avoid certain language used in some programming.

Closed caption signals display the text associated with spoken words at the bottom of a television screen. Such signals are available on most modern television sets and are associated with most broadcast, cable and satellite signals. These signals frequently display objectionable language. Because the objectionable language is in text, which may remain on the screen for several seconds, it is frequently more glaring and objectionable than the audio track.

For the foregoing reasons, there is a need for censoring assembly to be used with televisions that can remove undesired words and phrases from the closed caption associated with programming viewed on a television. There is a similar need for a censoring assembly to remove the undesired audio portions of programming displayed on a television.

SUMMARY

The present invention is directed to an apparatus that satisfies the above needs. A novel censoring assembly is adapted for use with a signal having a closed caption component that is output from a television tuner. The censoring assembly removes objectionable language from the closed caption and audio signals. The censoring assembly of the present invention provides some or all of the following structures.

(A) A closed caption decoding device, connected to the signal output from the television tuner, produces a video signal having no closed caption component and converts the closed caption component to an uncensored text data signal.

(B) A censor device, connected to the closed caption decoding device, deletes portions of the uncensored text data signal found to be objectionable, thereby forming a censored text data signal. The censor device may also include:

(a) A switching device for switching off—for a timed period—an audio signal portion of the signal output from a television tuner in response to the need to delete portions of the uncensored text data signal found to be objectionable.

(b) A list of offensive words to be censored.

(c) Support for allowing the user to add or delete words within the list of offensive words.

(d) Support for modifying the list of offensive words by down-loading information from a remote location.

(C) A closed caption encoder, connected to the censored text data signal and to the video signal having no closed caption component, generates a video signal having a censored closed caption component.

It is therefore a primary advantage of the present invention to provide a novel censoring assembly for removing objectionable language from the closed caption and audio portions of programming displayed on a television that is adapted for use with any programming source having a closed caption signal, including broadcast, cable, satellite and recorded media.

Another advantage of the present invention is to provide a novel censoring assembly for removing objectionable language from the closed caption and audio portions of programming displayed on a television having the flexibility of a built-in list of offensive words to be censored, as well as allowing the user to customize the language content to be censored, or allowing the down-loading from a remote site information indicating the content to be censored.

A still further advantage of the present invention is to provide a novel censoring assembly for removing objectionable language from the closed caption and audio portions of programming displayed on a television that results in only the narrow objectionable portions of the programming being censored, rather than entire programs being censored, and which does not depend on a rating system, such as G, PG, R, etc.

DRAWINGS

These and other features, aspects, and advantages of the present invention will become better understood with regard to the following description, appended claims, and accompanying drawings where:

DESCRIPTION

Figure 1:
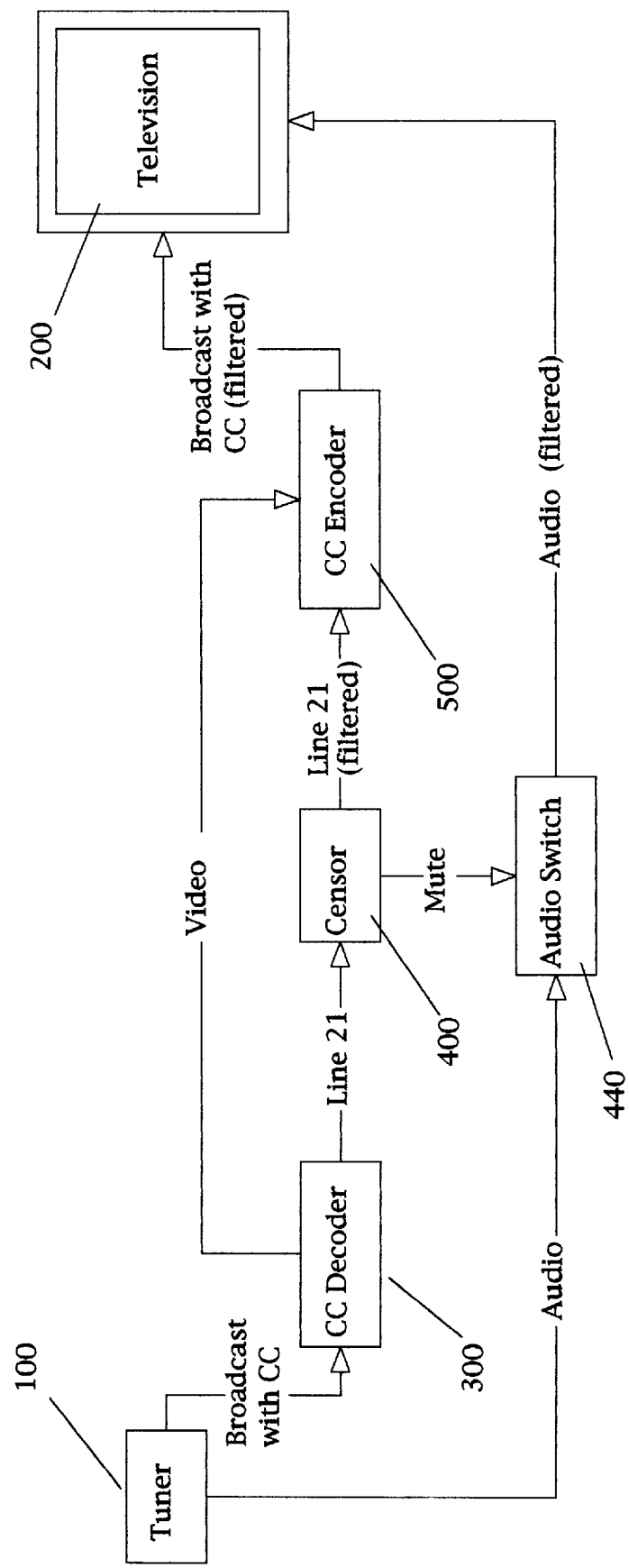
FIG. 1 is a diagram illustrating the relationship of the components contained in a version of the invention, and discloses a censoring assembly adaptable for use with closed caption television programming, a tuner and a television.

Referring to the diagram of FIG. 1, the layout of a version of the censoring assembly is seen. The censoring assembly is adapted for use with known television tuners 100 and televisions 200. A closed caption decoding device 300 produces a video signal having no closed caption component and converts the closed caption component into an uncensored text data signal. A censor device 400 deletes words contained within the uncensored text data signal found in a list of offensive words, creating a censored text data signal, and may activate an audio switch, turning off the audio signal for a timed period. The list of offensive words is generally pre-loaded with objectionable words and phrases, but the censor device typically contains support for allowing the user to add objectionable words and for the down-loading of objectionable words from a remote location. A closed caption encoder 500 inputs the video signal having no closed caption component and the censored text data signal and generates a video signal having a censored closed caption component for display on a television 200.

Referring again to the diagram of FIG. 1, a block component representing a tuner 100 of a type which could be used with the censoring assembly of the invention is seen. The tuner may be associated with a cable TV or satellite dish descrambler, a VCR or the tuner carried internally by a television. The input to the tuner is typically a plurality of weak radio frequency signals. The tuner then selects a single signal, which is amplified. The output of the tuner is typically a video signal, having a closed caption component. The video signal is consistent with known standards and contains an associated audio signal.

It should be noted that where a VHS or similar cassette, video disk, or other media containing recorded programming having a closed caption signal is used, the tuner may be replaced by such a device. Therefore, the invention is operative with any signal having an embedded closed caption component signal, whether of a broadcast nature or derived from a recorded media.

Continuing to refer to the diagram of FIG. 1, the closed caption decoder 300 is seen. The closed caption decoder device is typically in the form of a card insertable into standard personal computers, and may be carried by the censoring assembly. The closed caption decoder is a device which receives as input the signal from the tuner having a video signal in a standard format containing a closed caption component. The closed caption decoder has two output signals. A first output includes a video signal having no closed caption component is sent to the closed caption encoder, as will be seen. A second output includes an uncensored text data signal is sent to the censor device.

An example of such a stand-alone closed caption decoder is the HUBCAP from Soft Touch, Inc.

The censor device 400 is a microprocessor- or microcontroller-based device, and is carried within an enclosure housing the censoring assembly. The censor device provides a microprocessor or microcontroller, required logic circuitry, and RAM and ROM memory, but generally does not have a monitor, keyboard or disk drives.

The censor device 400 receives as input the uncensored text data signal sent by the closed caption decoder 300. The censor device outputs a censored text data signal to the closed caption encoder. The censored text data signal is a subset of the text data signal, having objectionable words removed. The objectionable words may be replaced by X's or spaces. In practice, any word found in the uncensored text data signal that is also found in the list of offensive words is removed. The words not removed then form the censored text data signal.

The censor device's list of offensive words is typically held in static RAM or ROM memory. The list of offensive words includes words and phrases that are to be deleted from the closed caption and/or audio signals.

The censor device includes a software program which reads in each word contained in the uncensored text data signal in real time and compares the list of offensive words. In a typical application, spell-check type software technology is used. This may involve binary look up trees or other well-known algorithms which allow the rapid comparison in real time of a stream of words to a list of offensive words or other listing of words.

Figure 4:
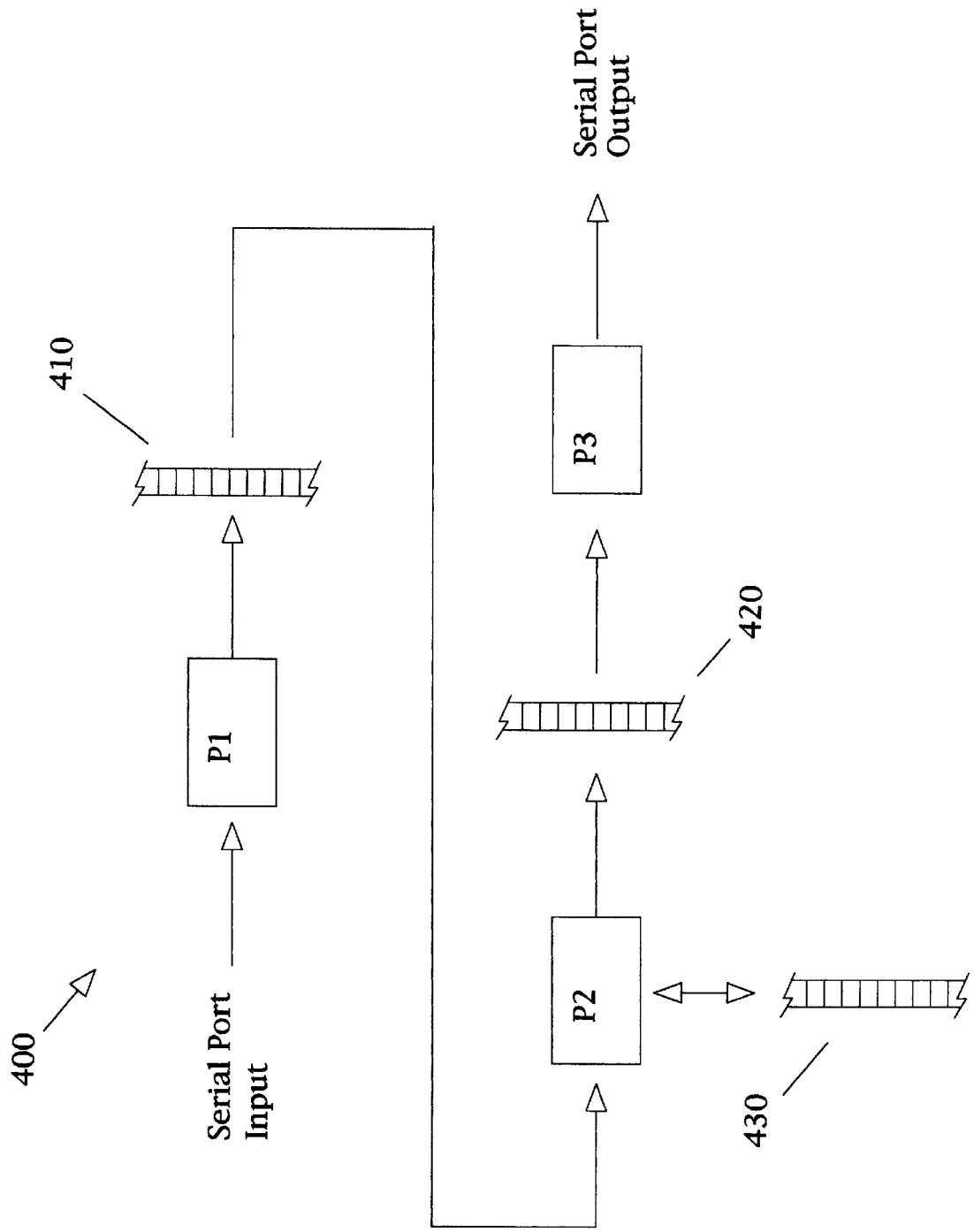
FIG. 4 is a diagram illustrating the details of a version of the censor device seen in FIGS. 1–3.

Referring to FIG. 4, a diagram illustrating the operation of a version of the censor device 400 is seen. The censor device includes software components potentially operated on a variety of different hardware platforms. In a the preferred embodiment illustrated in FIG. 4, three simultaneously operating programs, P1, P2 and P3 are supported by a multitasking operating system such as Microsoft MS-DOS and the A.T. Barrett RTXC kernel.

Figure 2:
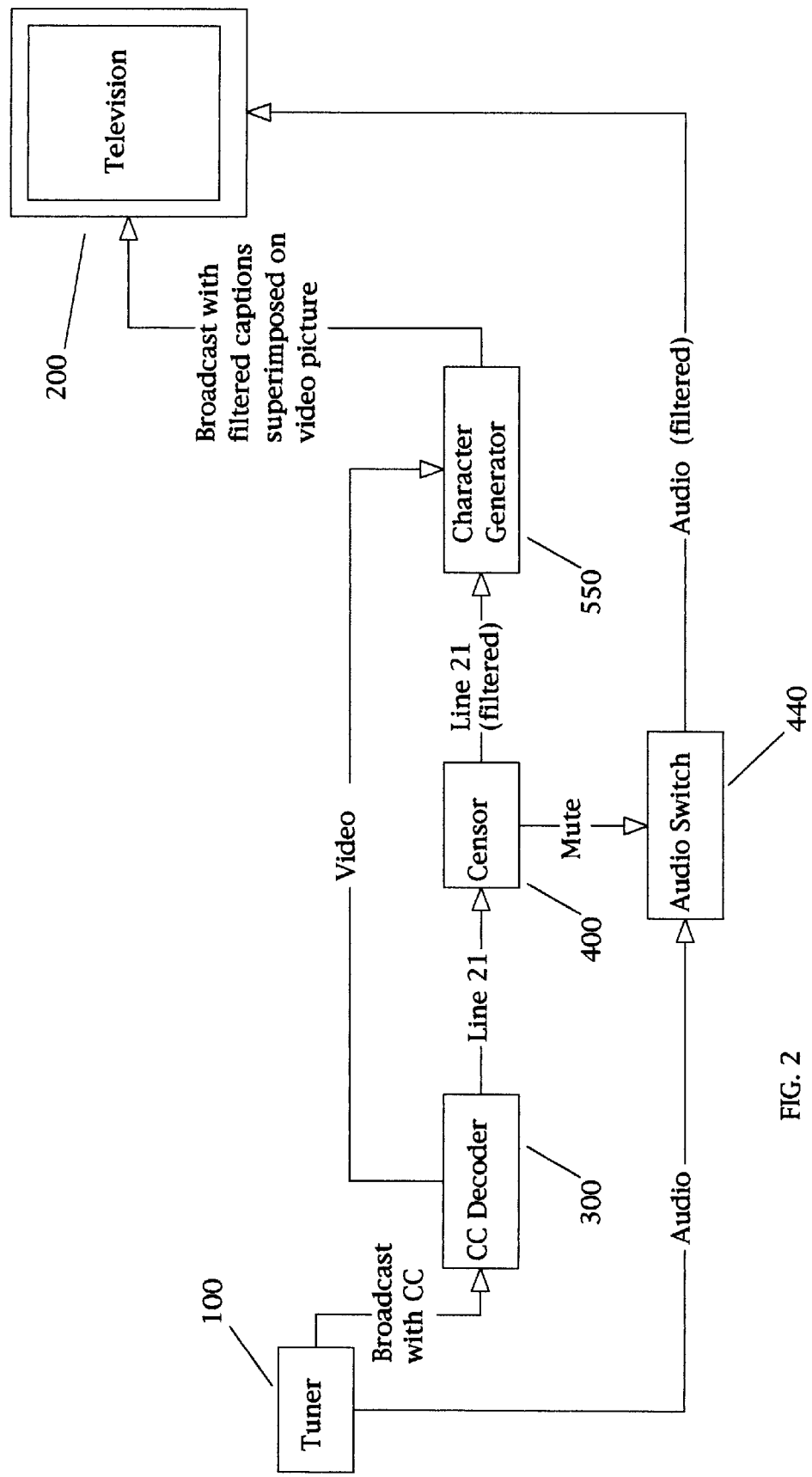
FIG. 2 is a diagram illustrating a version of the invention similar to that of FIG. 1, having a character generator in place of the closed caption generator.
Figure 3:
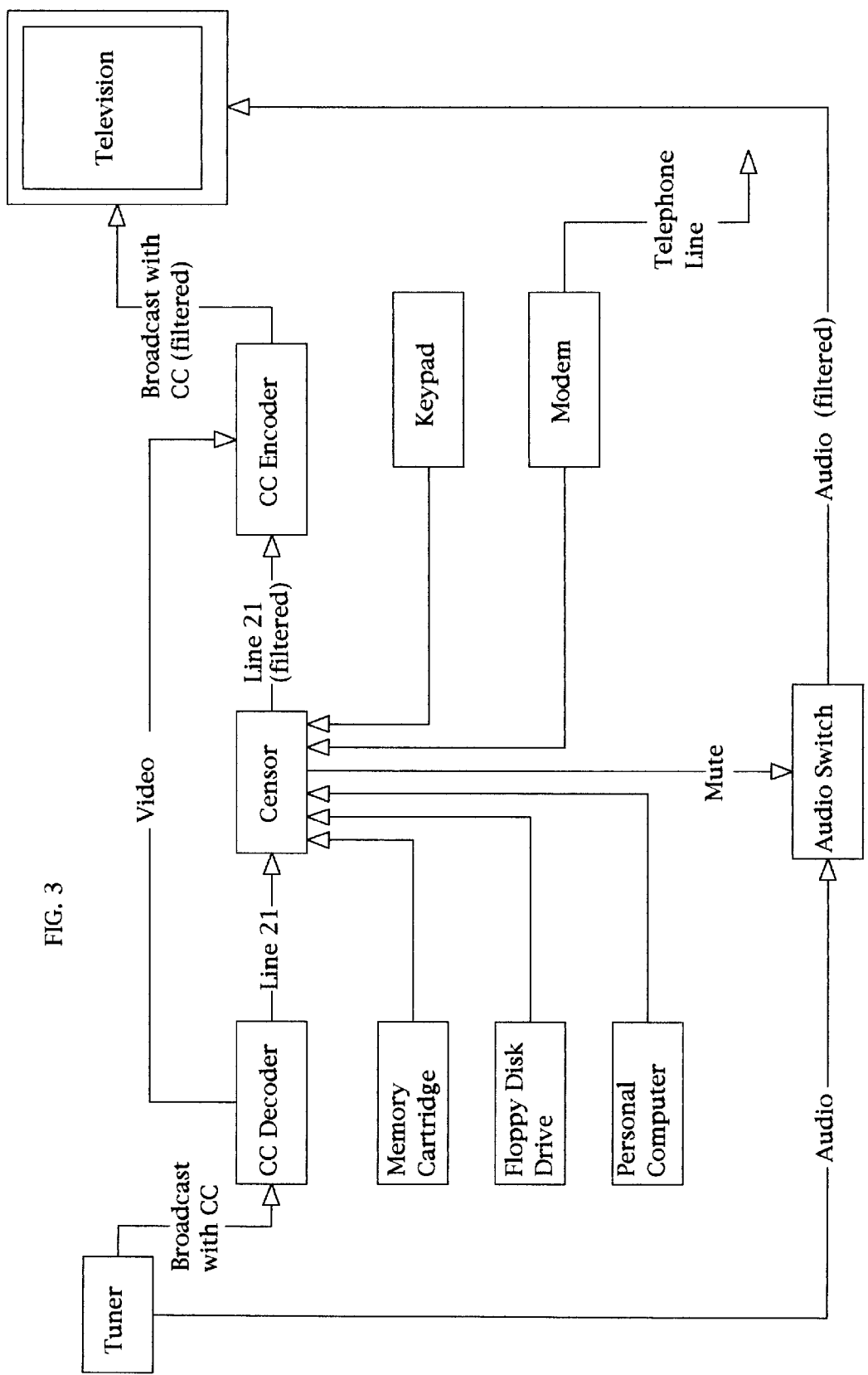
FIG. 3 is a diagram illustrating a third version of the invention, having a variety of input devices for input of words to be censored by the censor unit.

As seen in FIGS. 1–3, the output from the CC Decoder 300 is the Line 21 data of the closed caption signal. This data is input into the Serial Port Input in the censor device 400, and is in the form a serial stream of ASCII text, or the equivalent.

Referring to FIG. 4, program P1 operates in an infinite loop that monitors the input serial port, reading data as it comes in. When an incoming character is detected it is put into a data stack or queue 410 which is typically located in RAM memory. In a typical application, program P1 will operate pointers and counters, also located in RAM, hich indicate the location of the first character in the queue and the length of the queue.

Program P2 reads characters of the stack or queue 410, replaces characters forming objectionable words or phrases with X's, and transfers non-objectionable characters to stack or queue 420. As P2 reads each character from queue 410, it first determines if the character is a printable character or a non-printable control character. Non-printable control characters are used to define where the captions are to be displayed on the TV screen and how they are to be formatted. Non-printable characters are transferred to the queue 420 unchanged.

Printable characters, including numbers, letters and punctuation characters are transferred temporarily to a buffer where they are assembled into a word. Where the buffer is empty, punctuation characters are passed directly to queue 420. Letter and number characters are added directly to the buffer. In the preferred implementation of program P2, words are assumed to be delimited by punctuation or blank spaces. In most cases, when a punctuation character or space is received, and the buffer is not empty, it is assumed that the buffer contains a complete word.

The buffer word is then compared by program P2, in real time, against a listing of offensive words. In a preferred embodiment of the invention, the listing of offensive words is alphabetized and the comparison is done using a recursive binary search. The list of offensive words is divided in half, and the word is compared against the word in the middle of the list. If the two words are identical, then the buffer word is replaced, typically by a number of X's, which are passed to the queue 420, followed by the character, typically a space or punctuation mark, that followed the buffer word.

If the buffer word is alphabetically lower than the word selected from the word taken from the list, then comparison process is repeated recursively, using the first half of the list of offensive words. Similarly, if the word in the buffer is alphabetically greater than the word that was just compared, the comparison process is repeated using the second half of the redefined list of offensive words. The process is repeated until a match is found or the entire list has been checked.

If the word in the buffer is not found to match any words in the offensive word list, then program P2 places the word in queue 420. If the word in the buffer is found to match a word in the offensive word list, then a number of X's or other suitable character are placed in queue 420.

Program P3 continuously monitors and adjusts the stack pointers and stack length variables associated with the stack or queue 420, and transfers characters as they are placed in the queue 420 to the output serial port. As seen in FIG. 1, characters placed on the output serial port are transferred to the CC Encoder.

The censor device 400, seen in FIGS. 1–3, contains a list of offensive words. In terms of software database structures, the database structure of the list of offensive words is of a known type, and resembles those used by known spell-check software, and could be implemented in a variety of equivalent manners. The list may be physically maintained within the censor unit by a number of structures, including static RAM, ROM or hard disk drives. In the preferred embodiment of the invention, the list may be modified by the user in response to the changing personal taste of the user, or in response to changing television programming.

Referring to FIG. 3, the list of offensive words may be modified by use of a number of different structures. Memory cartridges, floppy disks or personal computers may be used to add to, delete or modify the list of offensive words. Memory cartridges, typically including a ROM integrated circuit or other solid state memory device, may be preprogrammed With lists of offensive words to be censored. Such cartridges may be attached to sockets carried by the censor device 400.

Similarly, a floppy disk drive unit may be attached to the censor unit to allow the convenient modification of the list of offensive words by use of a floppy disk. Use of such as disk allows the use of a personal computer to create disks to generate and modify the list of offensive words.

In some circumstances, it may be desirable to update or form the list of offensive words within the censor unit by use of a serial RS-232 or RS-422 connection to a personal computer. As seen in FIG. 3, the censor unit may be equipped with a serial port to facilitate such a connection.

Where a list of words is available at a remote site for downloading, a modem and telephone line may be used to transfer one or more words, or an entire fist or words. As a result, parent's groups, non-profit organizations, churches, etc., may potentially form their own list of offensive words, which users may elect to download.

A basic, or generic, list of offensive words may be pre-loaded in during the manufacture of the censoring assembly. In this circumstance, words found offensive to wide segments of the population are pre-loaded.

The censor device 400 may also have a switching device 440, as seen in the diagram of FIG. 1, which allows the censor unit to turn off the audio signal for a timed period following the appearance in the uncensored text data signal of a word found in the list of offensive words. This typically prevents the audio track of the signal from causing an offensive word to be broadcast by the speaker of the television set. The timed period may be regulated in hardware or by software timers.

The period of time for which the audio signal is turned off is somewhat flexible. A longer period during which the signal is turned off tends to decrease the chance of objectionable material getting through; however, this also tends to censor a greater amount of unobjectionable material. A shorter period during which the signal is turned off tends to have the opposite effect.

The period of time for which the audio signal is turned off may also be a function of the word or phrase encountered. Where a particularly objectionable word, or particular lengthy objectionable phrase is encountered, the audio signal may be turned off for a relatively long period of time. Similarly, where the word is less objectionable and does not involve a lengthy phrase, the audio signal may be turned off for a relatively short period of time.

Referring again to the diagram of FIG. 1, it can be seen that a closed caption generator 500 receives two input signals. A video signal having no closed caption component is received from the closed caption decoder. Also, a censored text data signal is received from the censor device 400. The closed caption generator outputs a video signal having a censored closed caption component to the television. The censored closed caption component includes text generated from the censored text data signal.

The closed caption generator is typically in the form of a card insertable into standard personal computers. An example of a closed caption generator suitable for use would be sold under the name CCEplus.

As seen in the diagram of FIG. 1, a television 200 having a screen and audio speakers displays the video signal having a censored closed caption component from the closed caption generator and the audio signal from the audio switch, respectively.

As seen in FIG. 2, the CC Encoder 500 may be replaced by a character generator 550. Character generators are more widely available than CC Encoders. Where a character generator is used, some of the non-printable format control characters transmitted from the censor device 400 are not utilized. As a result, the character generator must be programmed to locate the text in a desirable location.

The previously described versions of the present invention have many advantages, including a primary advantage of providing a novel censoring assembly for removing objectionable language from the closed caption and audio portions of programming displayed on a television that is adapted for use with any programming source having a closed caption signal, including broadcast, cable, satellite and recorded media.

Another advantage of the present invention is to provide a novel censoring assembly for removing objectionable language from the closed caption and audio portions of programming displayed on a television having the flexibility of a built-in list of offensive words to be censored, as well as allowing the user to customize the language content to be censored, or allowing the down-loading from a remote site information indicating the content to be censored.

A still further advantage of the present invention is to provide a novel censoring assembly for removing objectionable language from the closed caption and audio portions of programming displayed on a television that results in only the narrow objectionable portions of the programming being censored, rather than entire programs being censored, and which does not depend on a rating system, such as G, PG, R, etc.

The invention resides not in any one of these features per se, but rather in the particular combination of all of them herein disclosed and claimed and it is distinguished from the prior art in this particular combination of all of its structures for the functions specified.

Although the present invention has been described in considerable detail and with reference to certain preferred versions, other versions are possible. For example, while preferred hardware and software suitable for the operation of the censor unit has been disclosed, it is clear that similar functionality could be created with some modification of the disclosed design. Also, while in a preferred embodiment the censor unit has been described as a stand-alone unit, to be used in conjunction with a VCR, cable box or other tuner and a television set, it is clear that the same structures and functionality could be built into a television set, using the tuner carried by the television set. Therefore, the spirit and scope of the appended claims should not be limited to the description of the preferred versions disclosed.

In compliance with the U.S. Patent Laws, the invention has been described in language more or less specific as to methodical features. The invention is not, however, limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A censoring assembly adapted for use with a signal having a closed caption component, the censoring assembly comprising:
   (A) closed caption decoding means, connected to the signal having a closed caption component, for producing a video signal having no closed caption component and for converting the closed caption component to an uncensored text data signal;
   (B) censor device means, connected to the closed caption decoding means, for deleting portions of the uncensored text data signal found to be objectionable, thereby forming a censored text data signal; and
   (C) closed caption generator means, connected to the censored text data signal and to the video signal having no closed caption component, for generating a video signal having a censored closed caption component.

2. The censoring assembly of claim 1, wherein the censor device means further comprises means for switching off, for a timed period, an audio signal portion of the signal having a closed caption component, in response to the deleting of portions of the uncensored text data signal found to be objectionable.

3. The censoring assembly of claim 1, wherein the censor device means further comprises a pre-loaded list of offensive words to be censored.

4. The censoring assembly of claim 1, wherein the censor device means further comprises means for allowing the user to add or delete words contained in a list of offensive words.

5. The censoring assembly of claim 1, wherein the censor device means further comprises means for modifying a list of offensive words by down-loading information from a remote location.

6. A censoring assembly adapted for use with a signal having a closed caption component, the censoring assembly comprising:
   (A) closed caption decoding means, connected to the signal having a closed caption component, for producing a video signal having no closed caption component and for converting the closed caption component to an uncensored text data signal;
   (B) censor device means, connected to the closed caption decoding means, for deleting portions of the uncensored text data signal found to be objectionable, thereby forming a censored text data signal, the censor device means further comprising:
      (a) means for switching off, for a timed period, an audio signal portion of the signal output having a closed caption component, in response to the deleting of portions of the uncensored text data signal found to be objectionable;
      (b) a list of offensive words pre-loaded with words to be censored;
      (c) means for allowing the user to add or delete words contained in the list of offensive words; and
      (d) means for modifying the list of offensive words by down-loading information from a remote location; and
   (C) closed caption generator means, connected to the censored text data signal and to the video signal having no closed caption component, for generating a video signal having a censored closed caption component.

* * * * *